United States Patent [19]

Imoto

[11] Patent Number: 4,970,713
[45] Date of Patent: Nov. 13, 1990

[54] WAVEGUIDE TYPE OPTICAL MULTIPLEXER/DEMULTIPLEXER WITH A WAVE GUIDE REGULATING FUNCTION

[75] Inventor: Katsuyuki Imoto, Sayama, Japan
[73] Assignee: Hitachi, Ltd., Tokyo, Japan
[21] Appl. No.: 238,377
[22] Filed: Aug. 31, 1988

[30] Foreign Application Priority Data

Sep. 11, 1987 [JP] Japan .............................. 62-226331

[51] Int. Cl.$^5$ .......................................... H04B 10/00
[52] U.S. Cl. .................................... 370/3; 350/96.13; 455/612
[58] Field of Search ............... 455/600, 601, 606, 607, 455/609, 610, 612, 619; 370/1, 3; 350/96.13, 96.17

[56] References Cited

U.S. PATENT DOCUMENTS

| 4,737,002 | 4/1988 | Boucouvalas | 350/96.13 |
| 4,752,120 | 6/1988 | Shimizu | 350/96.13 |
| 4,781,424 | 11/1988 | Kawachi et al. | 350/96.33 |
| 4,786,130 | 11/1988 | Georgiou et al. | 350/96.15 |
| 9,722,081 | 1/1988 | Fujito | 370/3 |

FOREIGN PATENT DOCUMENTS 0152991 2/1985 European Pat. Off. .

OTHER PUBLICATIONS

Low-Loss Directional Coupler Using High-Silica Embedded Channel Waveguides, pp. 22-23, OEC '86, Technical Digest, A3-3, Jul. 1986.
Chemistry of Glass, p. 45, published by Yugen-Gaisha Nisso Tsushin-sha, Aug. 20, 1974.
Handbook on Optical Communications, p. 90, published by Kabushiki-Kaisha Kagaku Shinbun-sha, Aug. 1984.
Imoto, "Guided Wave Multi/Demultiplexers with Compensation for Centre Wavelength Shift by Fabrication Process Fluctuations", Elect. Letters, vol. 23, #14, 7-87.
Toba, "5 GHz-spaced Eight Channel Wave Tunable Multi/Demultiplexers for Optical FDM Transmission Systems", Electronic Letters, vol. 23, #15, 7-87.
Ioto, "Guided Wave Multi-Demultiplexers with High Stopband Rejection", Elect. Letters, vol. 23, #9, 4-87, pp. 472-473.
Personick, "Switches Take to Optics", Electronics Week, 3-18-85, pp. 55-58.

*Primary Examiner*—Joseph A. Orsino
*Assistant Examiner*—L. van Beek
*Attorney, Agent, or Firm*—Pennie & Edmonds

[57] ABSTRACT

A waveguide type optical multiplexer/demultiplexer in which a directional coupler made of a three-layer structure wherein core waveguides (refractive index $n_c$: $n_c > n_b$) and a cladding (refractive index $n_r$: $n_r < n_c$) are successively stacked on a low refractive index layer (refractive index $n_b$), is provided with a thin film heater in or on the cladding, and a voltage is applied across the heater.

5 Claims, 10 Drawing Sheets

WAVEGUIDE TYPE OPTICAL MULTIPLEXER/DEMULTIPLEXER WITH A WAVE GUIDE REGULATING FUNCTION

BACKGROUND OF THE INVENTION

The present invention relates to a waveguide type optical multiplexer/demultiplexer the wavelength characteristics of which can be finely adjusted by an electric signal.

Multiplexed optical wavelength transmission technology in optical fiber communications is important for economizing a communication system. In the multiplexed optical wavelength transmission, an optical multiplexer/demultiplexer is an indispensable device.

Regarding the construction of the optical multiplexer/demultiplexer, researches have recently been made on a waveguide type structure which is intended for reduction in cost and 1-chip monolithic implementation. An example thereof is a directional coupler type optical demultiplexer (N. Takato et al.: "Low-loss Directional Coupler employing Highsilica Embedded Channel Waveguides," OEC '86, Technical Digest, A3-3, July 1986). As illustrated in FIGS. 9(a) and 9(b), it consists in a method wherein two optical waveguides are arranged in parallel, and optical demultiplexing characteristics are attained by utilizing the wavelength dependence of the coupling between the two optical waveguides.

Since the directional coupler type optical demultiplexer in the prior art has the simple construction, it has the merit of easy fabrication. However, it has the problem that the shift of a center wavelength arises due to the fluctuations of structural parameters during the process of manufacture, and lowering in the available percentage has been inevitable. FIGS. 10(a)–10(c) show the analytical results of the sensitivity of the optical demultiplexer as calculatively obtained by the inventor, and in each of the figures, the wavelength is taken on the axis of abscissas, while the loss is taken on the axis of ordinates. FIG. 10(a) indicates the results in the case where the core width W of each waveguide was caused to deviate ±5% from its set value of 10 μm, FIG. 10(b) the results in the case where the core thickness T of each waveguide was caused to deviate ±5% from its set value of 8μm, and FIG. 10(c) the results in the cases where the difference $\Delta n$ between the refractive indices of the core and cladding of the waveguide was caused to deviate ±5% from its set value of 0.25%. As seen from the figures, the deviations of the structural parameters shift the center wavelength relatively. It is understood that, among the aforementioned deviations, the deviation of the core width W is influential on the wavelength shift. Such a wavelength shift incurs degradation in the crosstalk immunity between the channels. With the prior-art optical demultiplexer, the center wavelength shift ascribable to the fluctuation of any structural parameter cannot be remedied, and it has resulted in the lowering of the available percentage because articles with the center wavelength shifts are not usable.

SUMMARY OF THE INVENTION

An object of the present invention is to provide a waveguide type optical multiplexer/demultiplexer which can correct the center wavelength shift stated above. As a result, the articles of an optical multiplexer/demultiplexer having heretofore become unusable due to the center wavelength shifts can be effectively used, so that the optical multiplexer/ demultiplexer has its cost reduced sharply. Moreover, since a center wavelength shift ascribable to the change of an environmental condition during the service of an actual system can also be automatically controlled, crosstalk attributed to the interchannel interference of optical signal wavelengths can be suppressed.

The above object is accomplished by a waveguide type optical multiplexer/demultiplexer in which a directional coupler made of a three-layer structure wherein core waveguides (refractive index $n_c$:$n_c > n_b$) and a cladding (refractive index $n_r$:$n_r < n_c$) are successively stacked on a low refractive index layer (refractive index $n_b$), is provided with a thin film heater in or on the cladding, and a voltage is applied across the heater.

The voltage, is controlled so that the output value of a temperature detecting element provided in the optical multiplexer/demultiplexer may become a desired value. Alternatively, a plurality of directional couplers as described above are combined, at least one of the output ends of the directional couplers is provided with a photosensor element, and the voltage is controlled so that the output value of the photosensor element may become a desired value.

BRIEF DESCRIPTION OF THE DRAWINGS

FIGS. 1(a) and 1(b), and FIGS. 5(a) and 5(b) - FIGS. 8(a) and 8(b) show embodiments of waveguide type optical multiplexers/demultiplexers with a wavelength regulating function according to the present invention, respectively;

DESCRIPTION OF THE PREFERRED EMBODIMENTS

Figure 1A:
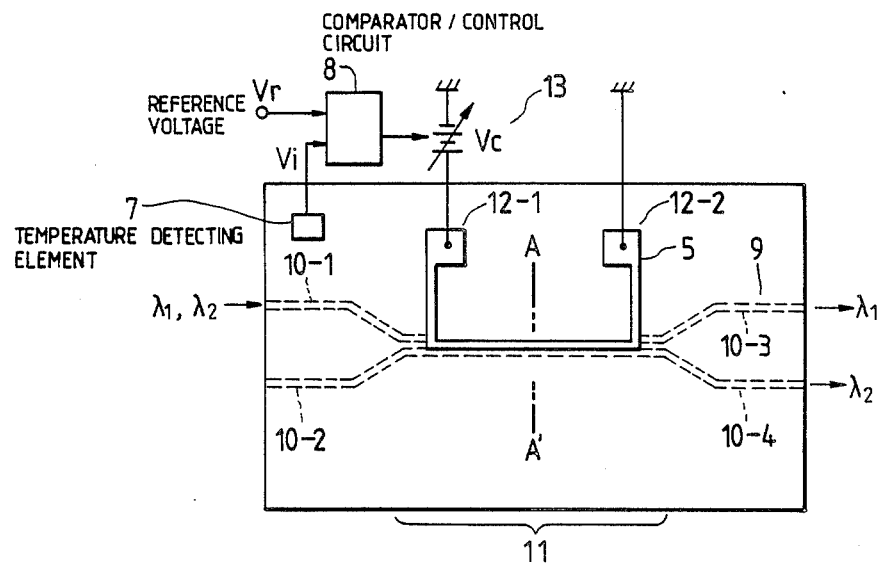
Figure 1B:
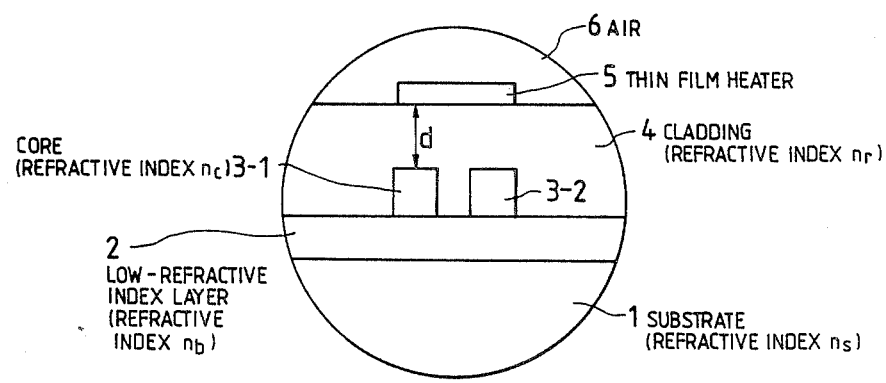
Figure 9A:
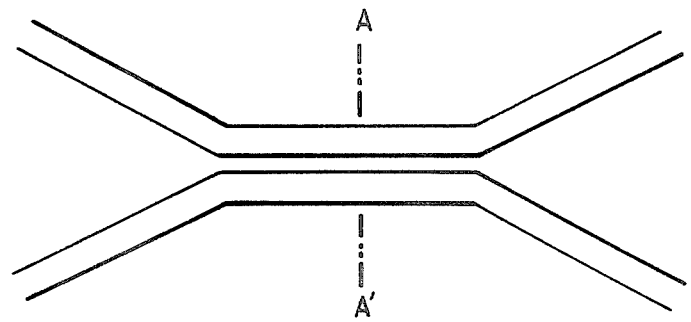
FIGS. 9(a) and 9(b) are schematic views of a waveguide type optical multiplexer/demultiplexer in a prior art.
Figure 9B:
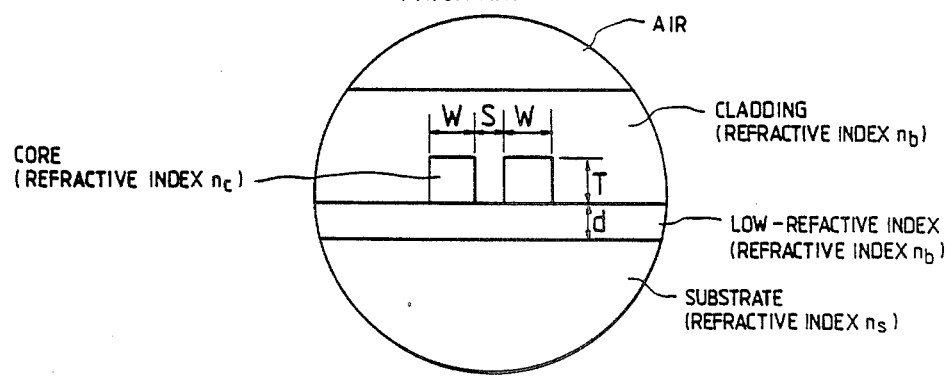
Figure 10A:
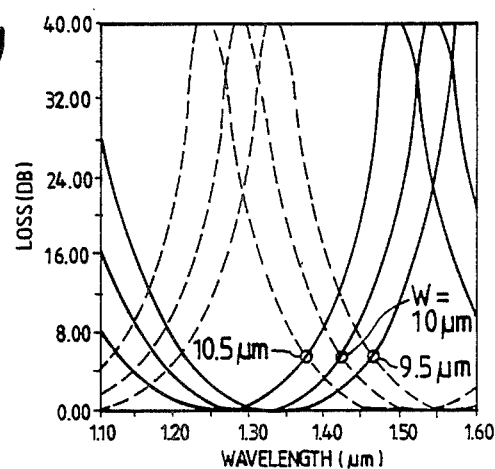
FIGS. 10(a)–10(c) show the analytical results of a sensitivity as to the prior-art, waveguide type optical multiplexer/demultiplexer.
Figure 10B:
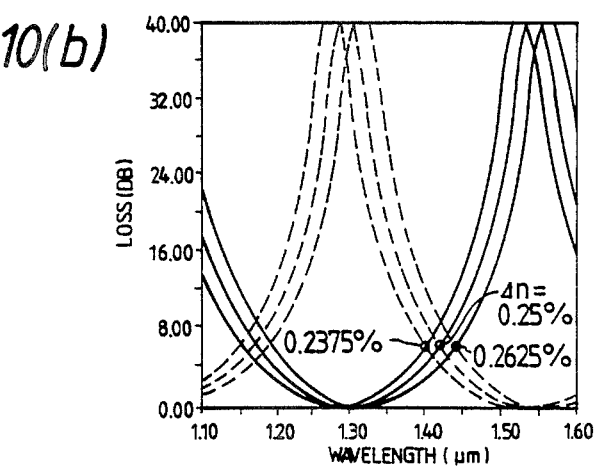
Figure 10C:
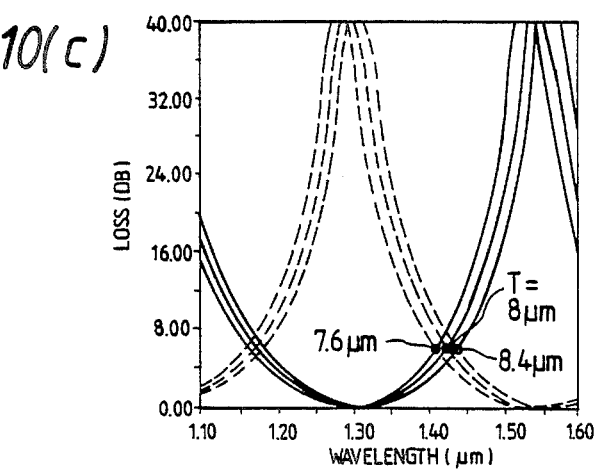

FIGS. 1(a) and 1(b) show an embodiment of a waveguide type optical multiplexer/demultiplexer with a wavelength regulating function according to the present invention. FIG. 1(a) shows a top view, while FIG. 1(b) shows a sectional view taken along A—A' in FIG. 1(a). First, the construction of the waveguide type optical multiplexer/demultiplexer will be described. This optical multiplexer/demultiplexer 9 is constructed of a so-called directional coupler wherein two cores 3-1 and 3-2 are proximately arranged in a coupling portion 11. More specifically, a substrate 1 (refractive index $n_s$) is overlaid with a low refractive index layer 2 (refractive index $n_b$), on which the cores 3-1 and 3-2 (refractive index $n_c$:$n_c > n_b$) are patterned. In addition, the structure has a cladding 4 (refractive index $n_r$:$n_r < n_c$) stacked on the cores. Here, the cladding 4 is made of SiO₂ which contains at least one dopant (for example, P, B, Ge or Ti) for controlling the refractive index. Now, the operation of the directional coupler 9 will be described. Optical signals of wavelengths $\lambda_1$ and $\lambda_2$ having entered the input port 10-1 of the directional coupler 9 are distributively coupled in the coupling portion 11 in which the cores 3-1 and 3-2 are proximately arranged. The optical signal of the wavelength $\lambda_1$ is guided to a port 10-3, while the optical signal of the wavelength $\lambda_2$ is branched to a port 10-4. As explained in connection with FIGS. 9(a) and 9(b), however, there has been the problem that the center wavelength of the branching characteristics shifts when the width W or thickness T of each of the cores 3-1 and 3-2 or the difference $\Delta n$ between the refractive indices of the core and the cladding fluctuates during the process of manufacture. As a method of automatically feedback-controlling the shift, a method has been thought out in which a thin film heater 5 is provided on the cladding 4, and a voltage 13 ($V_c$) is applied across the electrodes 12-1 and 12-2 of the heater 5. By adjusting this voltage, the feedback control is performed so that the center wavelength shift may be automatically rendered zero. Here, in order to prevent the heater 5 from affecting the propagation characteristics of light, a distance d from each of the cores 3-1 and 3-2 to the heater 5 is set to be sufficiently long. This value d is selected at 5 $\mu$m or above, more preferably at 10 odd $\mu$m. Regarding the principle, it is well known that, in general, substances such as dielectrics (glass, plastics, etc.) and semiconductors (Si, Ge, GaAs, InP, etc.) have their refractive indices changed depending upon temperatures. In addition, the rate of change $\Delta n$ of the refractive index n with respect to the temperature is approximately expressed by the following formula:

$$\frac{\Delta n}{n} \approx A - B\alpha T \quad (1)$$

Here, A, B: constants, $\alpha$: coefficient of thermal expansion, and T: temperature.

Figure 2:
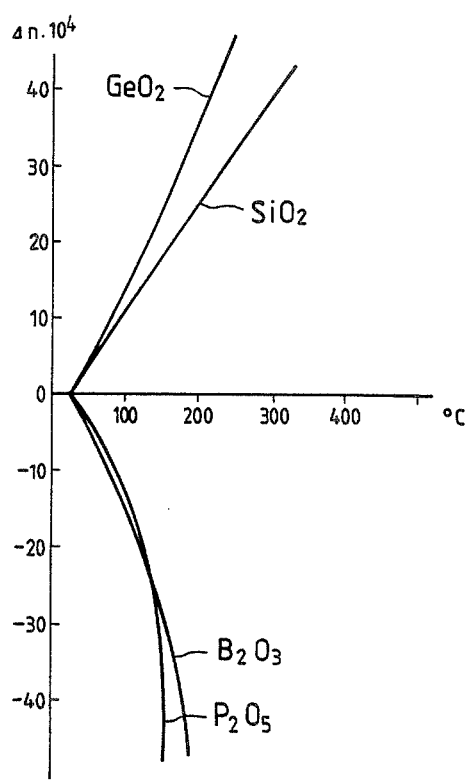
FIG. 2 and FIGS. 3(a) and 3(b) are graphs for explaining the operation of the present invention.
Figure 3A:
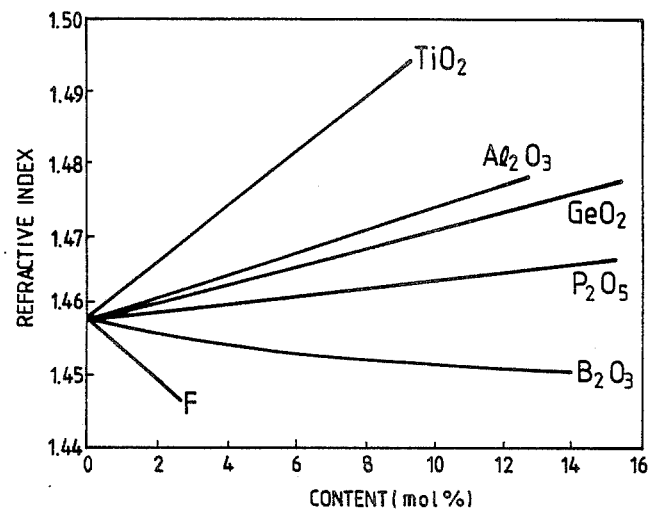
Figure 3B:
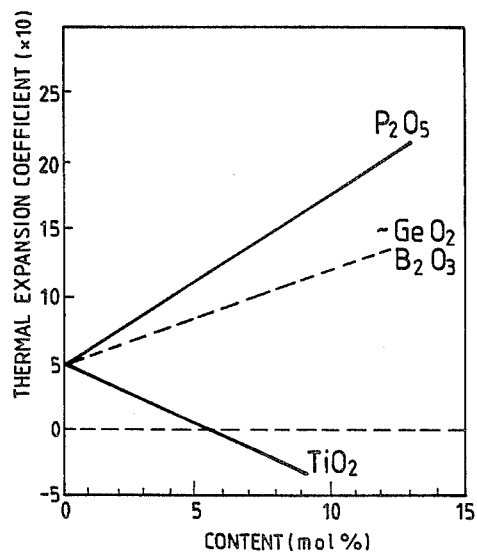

More specifically, FIG. 2 shows the changes of the refractive indices of glassy oxides dependent upon temperatures (A. A. Anneh: "Chemistry of Glass" published by Yuugen-Gaisha Nisso Tsushin-sha on Aug. 20, 1974, p. 45). In case of glass, it is known that, as compared with mere $SiO_2$, $SiO_2$ containing an oxide such as $B_2O_3$, $P_2O_5$ or $GeO_2$ exhibits a greater rate of change of the refractive index versus a temperature change. FIGS. 3(a) and 3(b) show the relationships of the refractive index and the coefficient of thermal expansion to the doping concentration of each of several silica dopants (Hirayama and four others: "Handbook on Optical Communications" published by KabushikiKaisha Kagaku Shinbun-sha in August 1984, p. 90). It is understood from the illustration that the coefficient of thermal expansion enlarges with increase in the doping quantity of the oxide such as $P_2O_5$, $B_2O_3$ or $GeO_2$ (refer to Formula (1)). Accordingly, the magnitude of change of the refractive index is greater in glass containing a larger doping quantity of oxides, such as multicomponent glass. It is also well known that the change of the refractive index is still greater in a material of large coefficient of thermal expansion, such as plastice. By the way, the value $\Delta n/\Delta T$ of the material is on the order of $-1- -5 \times 10^{-4}/°$ C. Usually, therefore, such a material of great index change is not employed because of the great temperature dependence. To the contrary, the present invention utilizes the temperature dependence positively.

Figure 4:
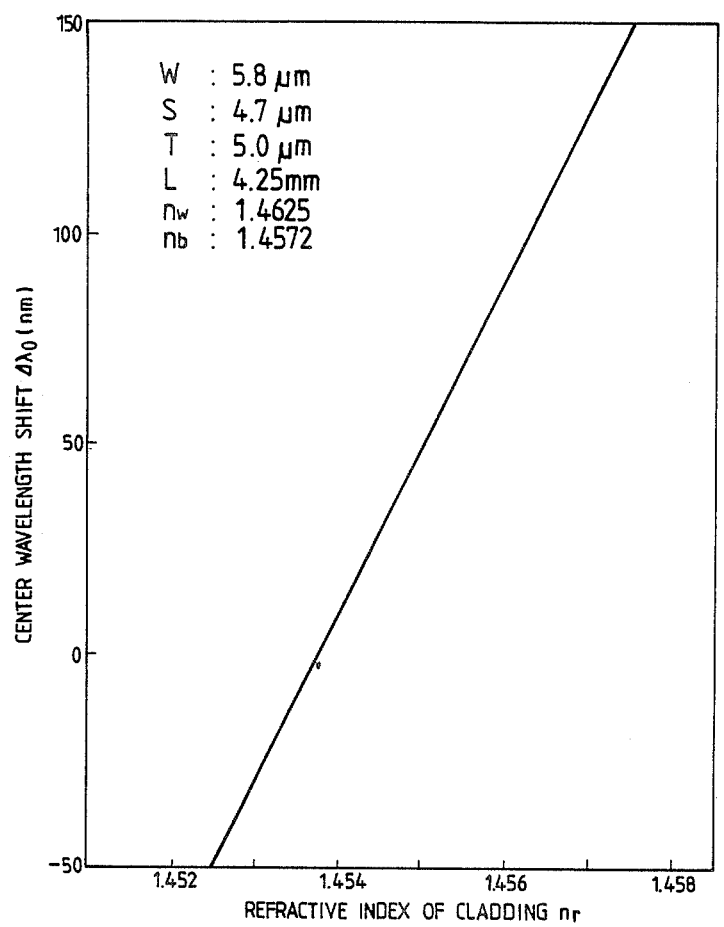
FIG. 4 shows the relationship between the refractive index $n_r$ of a cladding and the shift magnitude $\Delta \lambda_o$ of a center wavelength.

More specifically, the inventor proposed a directional coupler of a structure in which the refractive index ($n_b$) of the low refractive index layer 2 and that of the cladding 4 (refractive index $n_r$) were changed, and he studied it theoretically. Then, it has been found out that the center wavelength of branching or demultiplexing characteristics changes depending upon the refractive index $n_r$. FIG. 4 shows an example of the result, and indicates that the shift magnitude $\alpha\lambda$ of the center wavelength can be changed through the refractive index $n_r$. The refractive index $n_r$ changes depending upon temperatures (that is, when the temperature rises, the material expands, and hence, the refractive index lowers, whereas when the temperature lowers, the material shrinks, and hence, the refractive index heightens). Therefore, the refractive index $n_r$ can be controlled in such a way that the voltage $V_c$ is applied across the electrodes 12-1 and 12-2 of the thin film heater 5, whereby current is caused to flow through the heater 5 so as to regulate the temperature of the cladding 4. Next, a method of regulating the temperature will be explained. First of all, a reference voltage $V_r$ corresponding to a desired temperature is applied to one input end of a comparator/control circuit 8 beforehand. Subsequently, an electric signal $V_i$ from a temperature detecting element 7 (for example, Peltier effect) mounted on the cladding 4 is applied to the other input end of the comparator/control circuit 8, whereby the signals $V_r$ and $V_i$ are compared by the comparator/control circuit 8. For $V_r \neq V_i$, an error signal is produced and is amplified to generate a signal at the output end of the circuit 8. In a case where the temperature of the cladding 4 is lower than the desired temperature, the output signal acts to raise the voltage $V_c$ and to increase the current which flows through the heater 5. Conversely, in a case where the temperature of the cladding 4 is higher than the desired temperature, the output signal acts to lower the voltage $V_c$ and to decrease the current which flows through the heater 5. By regulating the temperature of the cladding 4 in the above way, the refractive index of the cladding 4 is controlled, with the result that the center wavelength shift $\Delta\lambda$ is rendered zero. Here, when the current is caused to flow through the heater 5, the temperatures of the cores 3-1, 3-2 and the low refractive index layer 2 are also raised, whereby the refractive indices thereof are also changed relatively, and hence, center wavelength shifts are also incurred by these changes. Since, however, the low refractive index layer 2 is connected with the substrate 1, the heat thereof is easily dissipated through the substrate 1 by heat conduction, so that it affects the center wavelength shift little. Moreover, since the dopant amount of the low refractive index layer 2 is smaller than that of the cladding 4, the rate of the index change versus the temperature is also smaller. The center wavelength shift ascribable to the temperatures of the cores may be considered similarly to the center wavelength shift ascribable to the temperature of the cladding, and may be controlled as the total center wavelength shift in accordance with the temperature. More specifically, while the optical outputs of the ports 10-3 and 10-4 are being monitored with, for example, a light spectrum analyzer, the voltage $V_c$ is controlled so as to render the center wavelength shift zero, and the value $V_i$ on that occasion is measured and is set as the value $V_r$. Then, in a case where the center wavelength shift has arisen due to an ambient temperature change, the comparator/control circuit 8 operates so as to establish $V_r = V_i$, and the feedback control is performed.

Figure 5A:
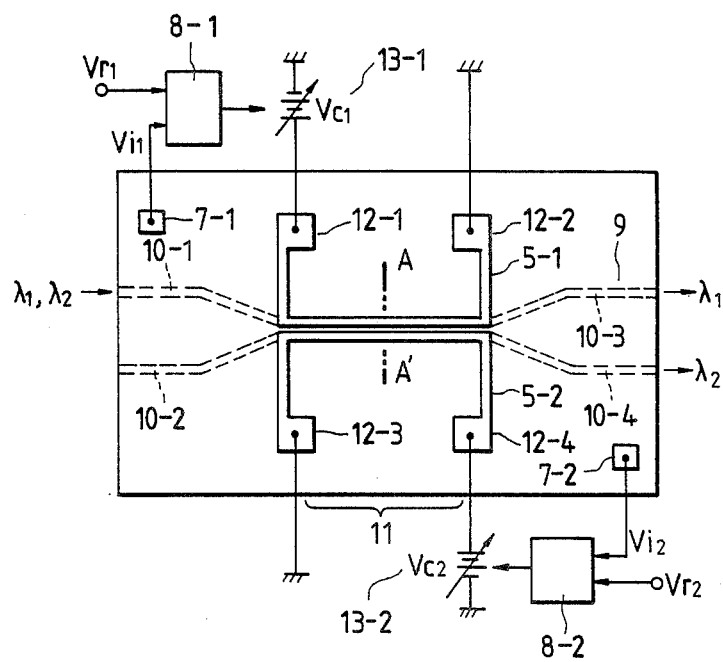
Figure 5B:
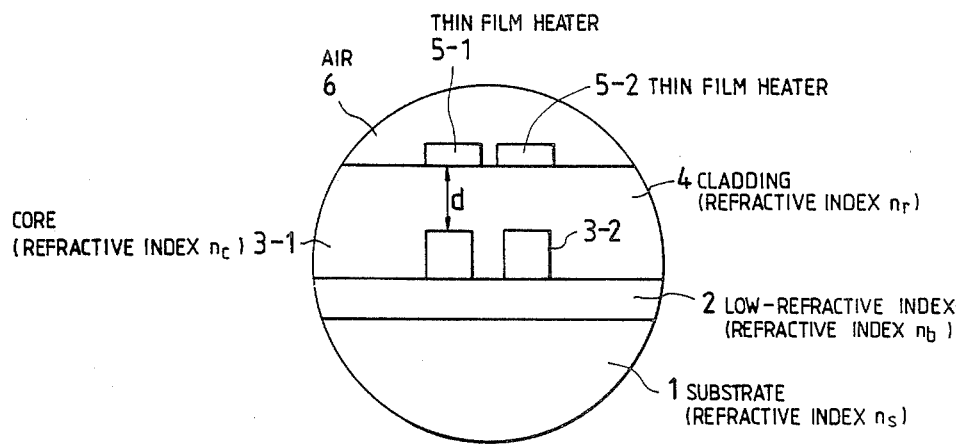

FIGS. 5(a) and 5(b) show another embodiment of the waveguide type optical multiplexer/demultiplexer having the wavelength regulating function of the present invention. FIG. 5(a) shows a top view, while FIG. 5(b) shows a sectional view taken along A - A' in FIG. 5(a). This embodiment is substantially similar to the embodiment of FIGS. 1(a) and 1(b), but it differs in that two, thin film heaters (5-1, 5-2) are provided. The thin film heaters 5-1 and 5-2 are disposed on the coupling portion 11 of a directional coupler. Voltages $V_{c1}$ and $V_{c2}$ are respectively applied to these thin film heaters. These voltages $V_{c1}$, $V_{c2}$ are respectively controlled by the error voltages between reference voltages $V_{r1}$, $V_{r2}$ and voltages $V_{i1}$, $V_{i2}$ having developed at the outputs of temperature detecting elements 7-1, 7-2. By installing the temperature detecting elements in the plurality of places of the waveguide type optical multiplexer/demultiplexer in this manner, nonuniformity in temperatures within the optical multiplexer/demultiplexer can be relieved.

Figure 6A:
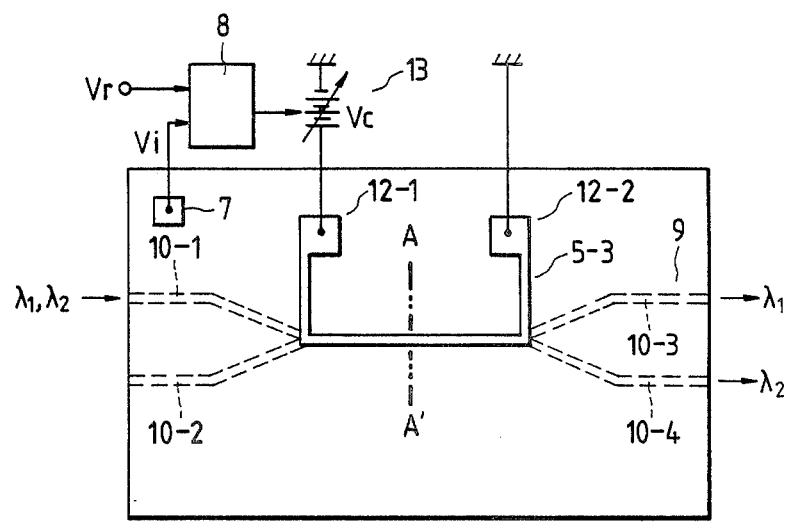
Figure 6B:
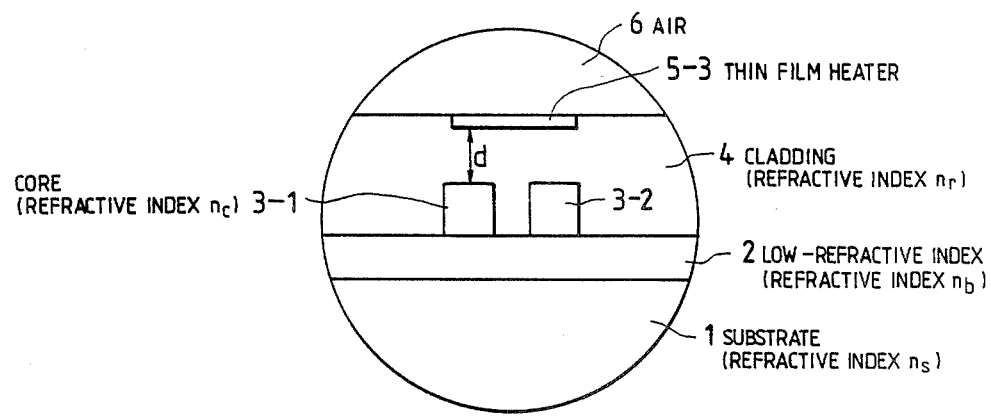

FIGS. 6(a) and 6(b) show still another embodiment of the waveguide type optical multiplexer/demultiplexer having the wavelength regulating function of the present invention. This embodiment consists in a construction in which a thin film heater 5-3 is buried in a cladding 4, so as to approach cores 3-1 and 3-2 to the utmost. Thus, the heat retaining property of the heater is improved. In order to more improve the heat retaining property, a glass film or a dielectric film (of, for example, plastics) may well be formed on the thin film heater 5-3.

Figure 7A:
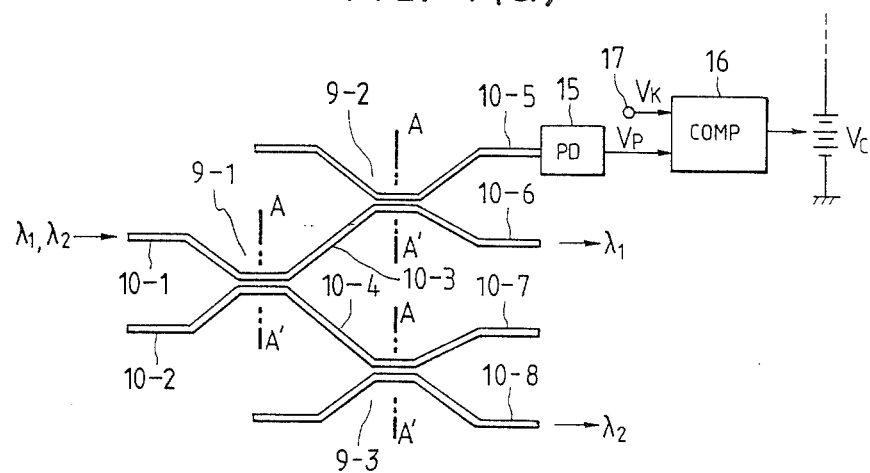
Figure 7B:
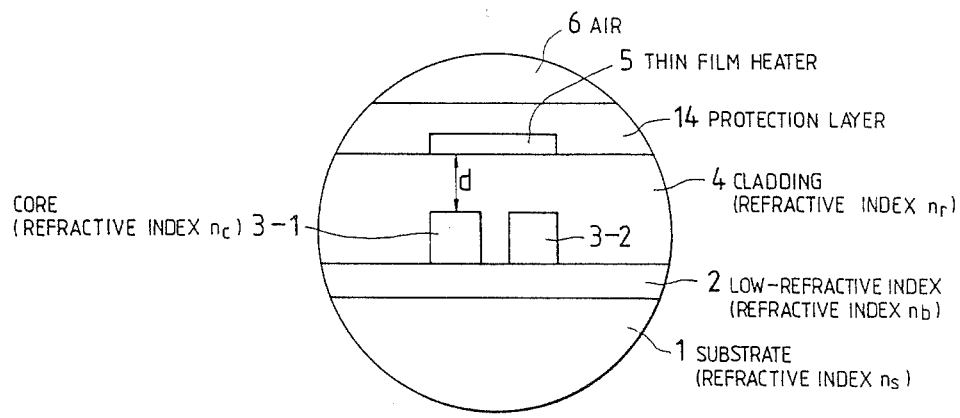

FIGS. 7(a) and 7(b) show yet another embodiment of the waveguide type optical multiplexer/demultiplexer having the wavelength regulating function of the present invention. This embodiment is the waveguide type optical multiplexer/demultiplexer constructed using three directional couplers (9-1, 9-2, 9-3). Of optical signals of wavelengths $\lambda_1$ and $\lambda_2$ having entered a port 10-1, one of the wavelength $\lambda_2$ is taken out at a port 10-6, and the other of the wavelength $\lambda_2$ at a port 10-8. In an ideal state, the optical signals of the wavelengths $\lambda_1$ and $\lambda_2$ do not appear at ports 10-5 and 10-7, respectively. More specifically, owing to the directional coupler 9-1, the optical signal of the wavelength $\lambda_1$ is demultiplexed into a port 10-3, and the optical signal of the wavelength $\lambda_2$ into a port 10-4. The directional coupler 9-2 (9-3) operates so as to suppress the undesired optical signal $\lambda_2$ ($\lambda_1$) which leaks into the port 10-3 (10-4). However, the center wavelength of demultiplexing characteristics shifts due to fluctuations in structural parameters, temperature fluctuations ascribable to the changes of environmental conditions, etc. during the process of fabrication. When the center wavelength shifts, the optical signals leak out at the ports 10-5 and 10-7. The optical signal is detected by a photosensor element 15 (for example, photodiode), to be converted into an electric signal $V_p$. This signal $V_p$ is input to a comparator circuit 16 together with a preset reference voltage $V_k$ (even in the absence of the center wavelength shift, the output of the photodiode involves noise voltages, voltages generated by receiving retrogressive lights from the individual ports, and the like voltages, and hence, a voltage value corresponding to the summation of these voltages is detected and set as the value of the reference voltage $V_k$ beforehand). For $V_p \neq V_k$, the applied voltage $V_c$ of a thin film heater 5 disposed on the coupling portion of each of the directional couplers is controlled. The control changes the temperature of the cladding 4 of each optical multiplexer/demultiplexer, with the result that the refractive index of the cladding 4 (as well as cores 3-1 and 3-2) changes to correct the center wavelength of the optical multiplexer/demultiplexer. In this case, the thin film heater 5 is covered with a protective layer 14 and has the heat retaining efficiency thereof enhanced. A photosensor element may also be provided at the port 10-7.

Figure 8A:
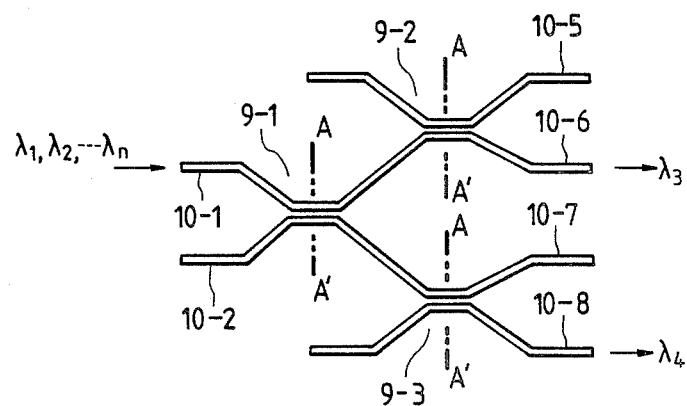
Figure 8B:
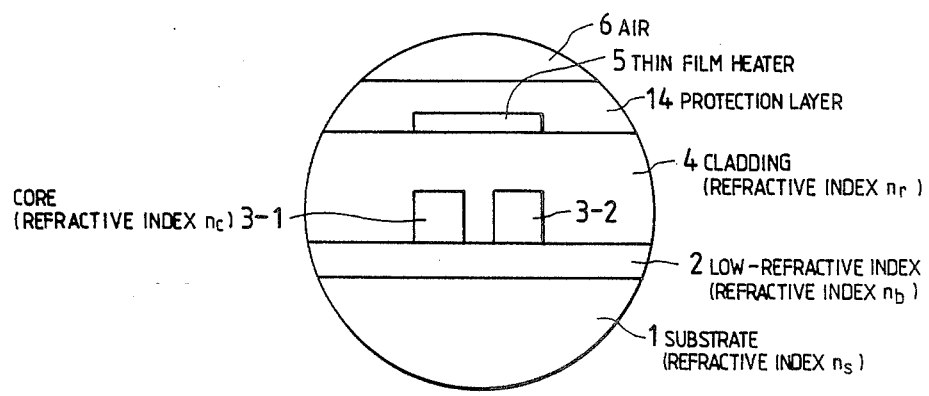

The present invention is not restricted to the foregoing embodiments. By way of example, as illustrated in FIGS. 8(a) and 8(b), an optical demultiplexer of the so-called variable wavelength type may well be constructed in which, as to optical signals of wavelengths $\lambda_1, \lambda_2, \ldots$ and $\lambda_n$ having entered the input port 10-1 of a directional coupler 9, the signals of any desired wavelengths (for example, $\lambda_3$ and $\lambda_4$) are respectively derived at the output ports 10-6 and 10-8 of directional couplers 9-2 and 9-3 by controlling voltages $V_c$ which are applied to thin film heaters 5. Thin films of Ti, $WSi_x$, etc. can be employed for the thin film heaters 5. They are formed by R. F. sputtering.

According to the present invention, the center wavelength shift of demultiplexing characteristics attributed to the fluctuation of any structural parameter during the manufacturing process of an optical multiplexer/demultiplexer, and the center wavelength shift of the demultiplexing characteristics attributed to the change of any environmental condition during the use of the optical multiplexer/demultiplexer in a practical system can be automatically corrected by an electrical feedback control. Therefore, crosstalk which is ascribable to the interchannel interference between the wavelengths of optical signals can be suppressed. In addition, a variable wavelength type optical multiplexer/demultiplexer can be realized by utilizing the above control.

What is claimed is:

1. A waveguide type optical multiplexer/demultiplexer for two or more signals which have different wavelengths, comprising:
   a substrate;
   a low-refractive index layer on the substrate;
   two core waveguides on the low-refractive index layer, distributively coupling each other;
   a cladding layer overlaying the core waveguides; and
   a thin film heater for varying the difference between the refractive indices of the cladding layer and core waveguides.

2. A waveguide type optical multiplexer/demultiplexer according to claim 1, wherein the thin film heater is controlled by temperature of the cladding layer.

3. A waveguide type optical multiplexer/demultiplexer according to claim 1, wherein the thin film heater is arranged on the cladding layer.

4. A waveguide type optical multiplexer/demultiplexer according to claim 3, further comprising a protection layer arranged on the thin film heater.

5. An optical multiplexer/demultiplexer for two or more signals which have different wavelengths, comprising:
   a plurality of directional couplers each comprising two cores and a cladding, each having a couple of input ports and a couple of output ports, a couple of output ports of one of the directional couplers connecting with the respective inputs of two other directional couplers, each of the directional couplers having a film heater which varies temperature of the coupler by a control signal; and
   means for providing the control signal for the film heater by detecting an optical signal leaked out at one of the output ports of one of the directional couplers.

* * * * *